United States Patent
Nomura et al.

(10) Patent No.: US 11,626,087 B2
(45) Date of Patent: Apr. 11, 2023

(54) HEAD-MOUNTED DEVICE AND CONTROL DEVICE THEREOF

(71) Applicant: CANON KABUSHIKI KAISHA, Tokyo (JP)

(72) Inventors: Osamu Nomura, Kanagawa (JP); Hiroshi Hosokawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/212,944

(22) Filed: Mar. 25, 2021

(65) Prior Publication Data

US 2021/0312892 A1 Oct. 7, 2021

(30) Foreign Application Priority Data

Apr. 2, 2020 (JP) .............................. JP2020-066954

(51) Int. Cl.
*G09G 5/377* (2006.01)
*G06F 3/01* (2006.01)
(Continued)

(52) U.S. Cl.
CPC ............. *G09G 5/377* (2013.01); *G06F 3/015* (2013.01); *G06V 20/10* (2022.01);
(Continued)

(58) Field of Classification Search
CPC ............. G09G 5/377; G09G 2340/125; G09G 2354/00; G09G 2370/02; G06F 3/015;
(Continued)

(56) References Cited

U.S. PATENT DOCUMENTS

| 2014/0139551 A1* | 5/2014 | McCulloch | G09G 5/377 |
| | | | 345/633 |
| 2014/0300633 A1* | 10/2014 | Sako | G06T 11/60 |
| | | | 345/633 |

(Continued)

FOREIGN PATENT DOCUMENTS

| JP | H0712378 B2 | 2/1995 |
| JP | H08229132 A | 9/1996 |

OTHER PUBLICATIONS

Jonathan Long, et al., Fully Convolutional Networks for Semantic Segmentation, Computer Vision Foundation, CVPR2015, pp. 3431-3440.

(Continued)

*Primary Examiner* — James A Thompson
*Assistant Examiner* — Kim Thanh T Tran
(74) *Attorney, Agent, or Firm* — Canon U.S.A., Inc. IP Division

(57) ABSTRACT

A control device of a head-mounted device is provided. The head-mounted device includes an image capturing device configured to capture an environment around a wearer and a display device configured to display an image to the wearer. The control device includes a first acquisition unit configured to acquire a first image captured by the image capturing device, a second acquisition unit configured to acquire a second image used to lead a mental state of the wearer to a target mental state, and a composition unit configured to composite the first image and the second image, thereby generating a third image to be displayed on the display device.

19 Claims, 14 Drawing Sheets

(51) Int. Cl.
*G06V 20/10* (2022.01)
*H04N 5/225* (2006.01)

(52) U.S. Cl.
CPC ... *G09G 2340/125* (2013.01); *G09G 2354/00* (2013.01); *G09G 2370/02* (2013.01); *H04N 5/2257* (2013.01)

(58) Field of Classification Search
CPC ......... G06F 3/012; G06F 3/147; G06V 20/10; G06V 10/454; G06V 10/82; G06V 20/20; G06V 40/16; H04N 5/2257
USPC .......................................................... 345/633
See application file for complete search history.

(56) References Cited

U.S. PATENT DOCUMENTS

| | | | |
|---|---|---|---|
| 2016/0077547 A1* | 3/2016 | Aimone | A61B 5/1114 345/8 |
| 2016/0220163 A1* | 8/2016 | Yamada | G16H 20/70 |
| 2018/0095542 A1* | 4/2018 | Mallinson | G06T 19/006 |
| 2019/0239861 A1* | 8/2019 | Kobayashi | A61B 8/463 |
| 2019/0269345 A1* | 9/2019 | Sriram | A61M 21/00 |

OTHER PUBLICATIONS

Shaoqing Ren, et al., Faster R-CNN: Towards Real-Time Object Detection with Region Proposal Networks, Advances in Neural Information Processing Systems, 2015, pp. 1-9.

Kenyu Uehara, et al., Proposal of Analysis Method Focusing on Nonlinear Dynamics of Human EEG with Chaos, Transactions of the JSME, Jul. 22, 2018, pp. 1-10, vol. 84, No. 864, The Japan Society of Mechanical Engineers.

Yaniv Taigman, et al., DeepFace: Closing the Gap to Human-Level Performance in Face Verification, Proceedings of the IEEE Computer Society Conference on Computer Vision and Pattern Recognition, 2014, pp. 1-8.

Ian J. Goodfellow, et al., Generative Adversarial Nets, Generative Adversarial Networks, Advances in Neural Information Processing Systems, 2014, pp. 1-9.

* cited by examiner

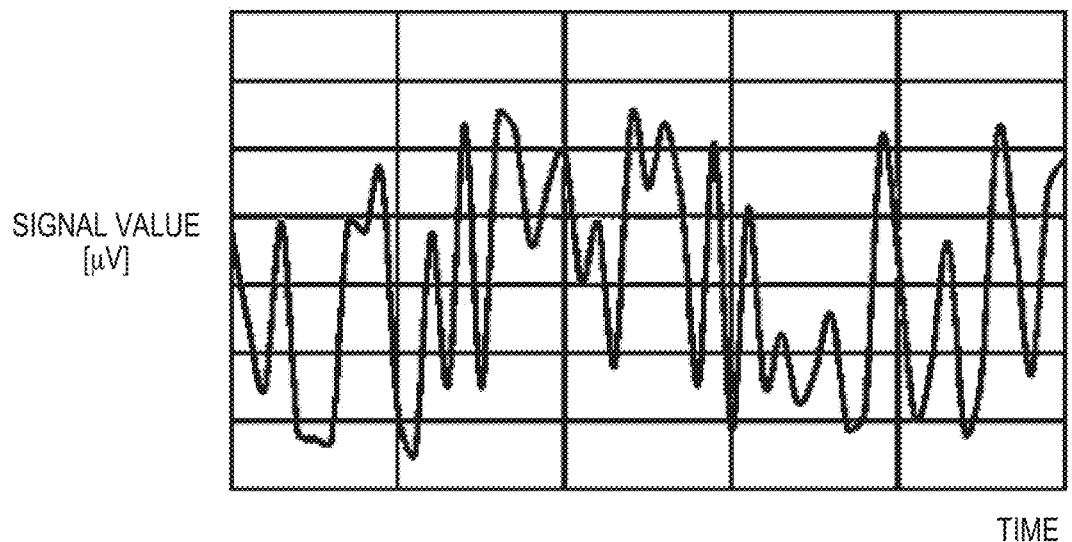

| | IMAGE ID | IMAGE FILE NAMES |
|---|---|---|
| LOW AWAKING STATE | L-01 | drive01.mp4 |
| | L-02 | drive02.mp4 |
| | L-03 | firework01.mp4 |
| | ... | ... |
| HIGH TENSION STATE | H-01 | grassfield01.mp4 |
| | H-02 | grassfield02.mp4 |
| | H-03 | beach01.mpr |
| | ... | ... |

HEAD-MOUNTED DEVICE AND CONTROL DEVICE THEREOF

BACKGROUND

Field of the Disclosure

The present disclosure relates to a head-mounted device and a control device thereof.

Description of the Related Art

Wearable devices configured to lead a user to a target mental state have been proposed. Wearable devices proposed in Japanese Patent Laid-Open No. H08-229132 and Japanese Patent No. H07-012378 each measure a biological signal of a user and display, for the user, an image that gives a visual stimulation according to the measurement result, thereby leading the user to a target mental state.

To lead the user to the target mental state, the user who uses the above-described wearable device views an image displayed on the wearable device. Since the wearable device completely covers the eyes of the user, and only the image is displayed on the wearable device, the user cannot visually recognize the peripheral situation. It is therefore difficult for the user to do another work.

SUMMARY

One aspect of the present disclosure provides a technique of allowing a user to do work while his/her mental state is led with images to a target mental state. In an embodiment, a control device of a head-mounted device is provided. The head-mounted device includes an image capturing device configured to capture an environment around a wearer and a display device configured to display an image to the wearer. The control device includes a first acquisition unit configured to acquire a first image captured by the image capturing device, a second acquisition unit configured to acquire a second image used to lead a mental state of the wearer to a target mental state, and a composition unit configured to composite the first image and the second image, thereby generating a third image to be displayed on the display device.

Further features of the present disclosure will become apparent from the following description of exemplary embodiments (with reference to the attached drawings).

BRIEF DESCRIPTION OF THE DRAWINGS

FIG. 6 is a view for explaining an example of a biological signal according to one or more aspects of the present disclosure;

FIG. 7 is a view for explaining an example of thresholds used to estimate a mental state according to one or more aspects of the present disclosure;

DESCRIPTION OF THE EMBODIMENTS

Figure 1A:
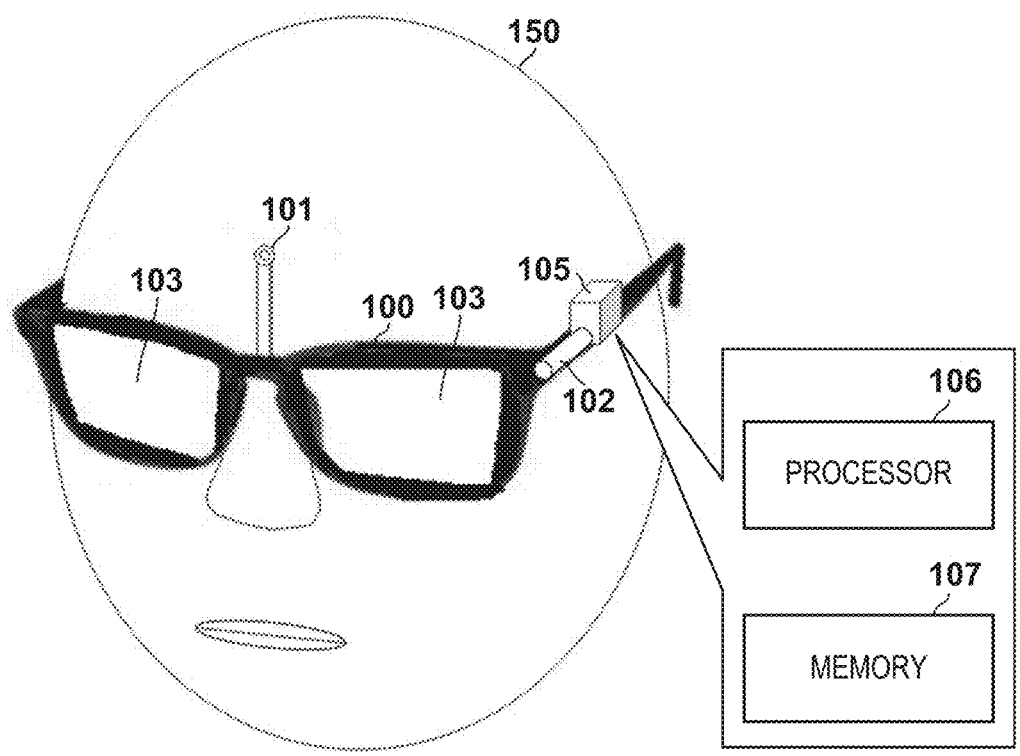
FIGS. 1A and 1B are views for explaining an example of the hardware arrangement of a glass-type device according to one or more aspects of the present disclosure.

Hereinafter, embodiments will be described in detail with reference to the accompanying drawings. It should be noted that the following embodiments are not intended to limit the scope of the present disclosure. A plurality of features are described in the embodiments, and not all the plurality of features are necessarily essential to the present disclosure. The plurality of features may arbitrarily be combined. In addition, the same reference numerals denote the same or similar parts throughout the accompanying drawings, and a repetitive description will be omitted.

Various embodiments of the present disclosure are related to a head-mounted device. The head-mounted device is a device that the user wears on the head and uses. The user who wears the head-mounted device can also be called a wearer. Examples of the head-mounted device are a glass-type device and a head-mounted display. Various embodiments will be described below using a glass-type device as an example. The following description can also be applied to head-mounted devices of other types.

First Embodiment

Figure 1B:
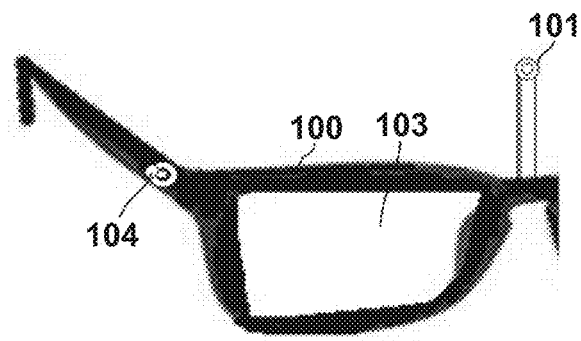

An example of the hardware arrangement of a glass-type device 100 according to the first embodiment will be described with reference to FIGS. 1A and 1B. FIG. 1A shows the outer appearance of the glass-type device 100 worn by a user 150. FIG. 1B shows the outer appearance of the glass-type device 100 viewed from a direction different from FIG. 1A. The glass-type device 100 includes a biosensor 101, an image capturing device 102, a display device 103, a switch 104, and a control device 105. These elements are attached to the frame of the glass-type device 100. The attachment positions shown in FIGS. 1A and 1B are merely examples, and the elements may be attached to other positions. The glass-type device 100 can also include a battery (not shown).

The biosensor 101 is a sensor that measures a biological signal of the user 150. In the example shown in FIG. 1A, the biosensor 101 is located at a position to contact the forehead of the user 150 when the glass-type device 100 is worn by the user 150. The biosensor 101 measures a brain wave from the forehead of the user 150.

The image capturing device 102 is a device (camera) that captures the environment around the user 150. The image capturing device 102 is formed by, for example, an optical system, an image sensor, a driver circuit that controls the image sensor, an A/D conversion circuit that converts a signal acquired by the image sensor into a digital signal, and a developing circuit that develops the obtained signal to an image. The image sensor may be, for example, a CMOS (Complementary Metal Oxide Semiconductor) sensor. The image capturing device 102 typically captures a moving image. When capturing a moving image, the image capturing device 102 may generate an image on a frame basis.

The image capturing device 102 may capture the environment on the front side of the user 150 as the environment around the user 150. The front side of the user 150 may be the front side of the head of the user 150. Instead, the image capturing device 102 may capture the environment in the visual line direction of the user 150 as the environment around the user 150. To capture the environment in the visual line direction, the glass-type device 100 may include a sensor configured to detect the visual line direction of the user, and the image capturing device 102 may change the image capturing range in accordance with a change of the visual line direction. Depending on the application purpose of the glass-type device 100, the image capturing device 102 may capture the environment not on the front side of the user 150 but, for example, on the upper side, a lateral side, or the rear side as the environment around the user 150.

The display device 103 is a device that displays an image to the user 150. The display device 103 may be, for example, a liquid crystal display or an organic EL (Electro Luminescence) display. The display device 103 is formed by, for example, a liquid crystal panel, a driver circuit that controls the liquid crystal panel, and a memory that holds an image to be displayed. The display device 103 can also be called a monitor. The glass-type device 100 may include two display devices 103. One display device 103 is arranged in front of the right eye of the user 150, and the other display device 103 is arranged in front of the left eye of the user 150. The two display devices 103 may display the same image or may display different images in consideration of the parallax between the left and right eyes of the user 150. The display device 103 may be arranged to block the visual field of the user 150. That is, the user 150 who wears the glass-type device 100 may be unable to visually recognize the environment behind the display device 103.

The switch 104 is a device configured to accept an operation from the user 150. The switch 104 may input directions, determination, and cancel, like a joystick. Also, the switch 104 may be used to switch on/off of the power supply of the glass-type device 100.

The control device 105 performs overall control of the glass-type device 100. The control device 105 can communicate with each of the biosensor 101, the image capturing device 102, the display device 103, and the switch 104. The communication may be wireless communication or may be wired communication. The control device 105 includes, for example, a processor 106 and a memory 107. The processor 106 is formed by, for example, a semiconductor chip. The processor 106 may be a CPU (Central Processing Unit). Also, if the control device 105 includes a plurality of processors 106, some processors 106 may be GPUs (Graphics Processing Units). The memory 107 may be formed by combining, for example, a RAM (Random Access Memory) and a ROM (Read Only Memory).

The processor 106 may function as the driver circuit of the image capturing device 102 or the driver circuit of the display device 103. In this case, the driver circuits of these devices may be omitted. The memory 107 may function as the memory of the display device 103. In this case, the memory of the display device 103 may be omitted.

An example of the functional arrangement of the glass-type device 100 according to the first embodiment will be described next with reference to FIG. 2. The glass-type device 100 includes an external world image acquisition unit 201, an image recognition unit 202, a biological signal acquisition unit 203, a mental state estimation unit 204, an image selection unit 205, an image composition unit 206, an image display unit 207, and a storage unit 208. These functional units may be implemented by the control device 105. Details of the operation of each functional unit will be described later, and an outline will be described here.

The external world image acquisition unit 201 controls the image capturing device 102, thereby capturing the environment around the user 150 who wears the glass-type device 100 and acquiring an image of the environment. The image recognition unit 202 performs predetermined recognition processing for the image acquired by the external world image acquisition unit 201.

The biological signal acquisition unit 203 acquires a biological signal of the user 150. Biological signal acquisition may include performing filter processing for a brain wave signal measured by the biosensor 101 and converting the signal after the filter processing into a digital signal. In the first embodiment, the biological signal acquisition unit 203 acquires a brain wave of the user 150 using the biosensor 101.

The mental state estimation unit 204 estimates the mental state of the user 150 based on the biological signal acquired by the biological signal acquisition unit 203. The image selection unit 205 selects an image used to lead the mental state of the user 150 estimated by the mental state estimation unit 204 to a target mental state. The image selection unit 205 may function as an acquisition unit configured to acquire an image used to lead a mental state of the wearer to a target mental state.

The image composition unit 206 composites the image acquired by the external world image acquisition unit 201 with the image selected by the image selection unit 205, thereby generating a new image. The image display unit 207 displays, on the display device 103, the image generated by the image composition unit 206. The storage unit 208 stores data (for example, the image selected by the image selection unit 205, and the like) to be used for the operation of the glass-type device 100.

The external world image acquisition unit 201, the image recognition unit 202, the biological signal acquisition unit 203, the mental state estimation unit 204, the image selection unit 205, the image composition unit 206, and the image display unit 207 may be formed by the processor 106. The storage unit 208 may be formed by the memory 107. The operation of each functional unit of the control device 105 may be performed by executing, by the processor 106, a program stored in the memory 107. Instead, some or all operations of the control device 105 may be performed by a dedicated circuit such as an ASIC (Application Specific Integrated Circuit) or an FPGA (Field Programmable Gate Array). For example, filter processing by the biological signal acquisition unit 203 may be performed by a filter circuit, and A/D conversion by the biological signal acquisition unit 203 may be performed by an A/D conversion circuit. If the control device 105 includes a plurality of circuits, these can communicate via a bus 209.

Figure 3:
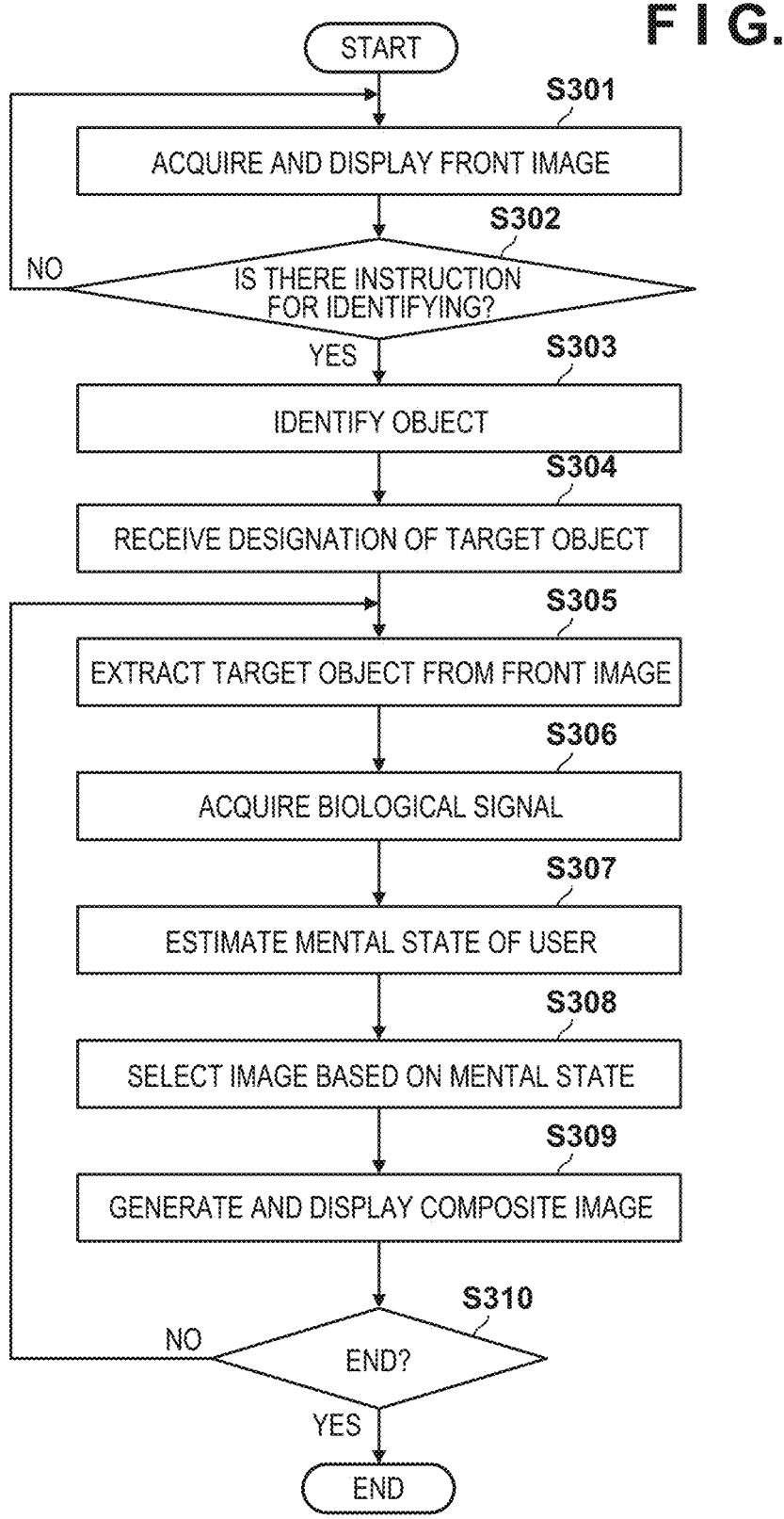
FIG. 3 is a flowchart for explaining an example of the operation of the glass-type device according to the first embodiment of the present disclosure.

An example of the operation of the glass-type device 100 according to the first embodiment will be described next with reference to FIG. 3. This operation is started when the user 150 wears the glass-type device 100 and turns on the power supply of the glass-type device 100. When the power supply is turned on, the glass-type device 100 performs an initialization operation. In the following operation, the glass-type device 100 displays, to the user 150, an image generated by superimposing a part of an image of the environment in front of the user, including a specific object, on an image used to lead the mental state of the user 150 to a target mental state. The target mental state is, for example, a mental state appropriate to the work of the user 150. What kind of mental state should be set to the target may be set by the user 150 in advance and stored in the storage unit 208.

In step S301, the external world image acquisition unit 201 acquires an image (to be referred to as a front image hereinafter) of the environment in front of the user 150. The image display unit 207 displays the front image on the display device 103. Also, the external world image acquisition unit 201 stores the front image in the storage unit 208 for subsequent processing.

Figure 4:
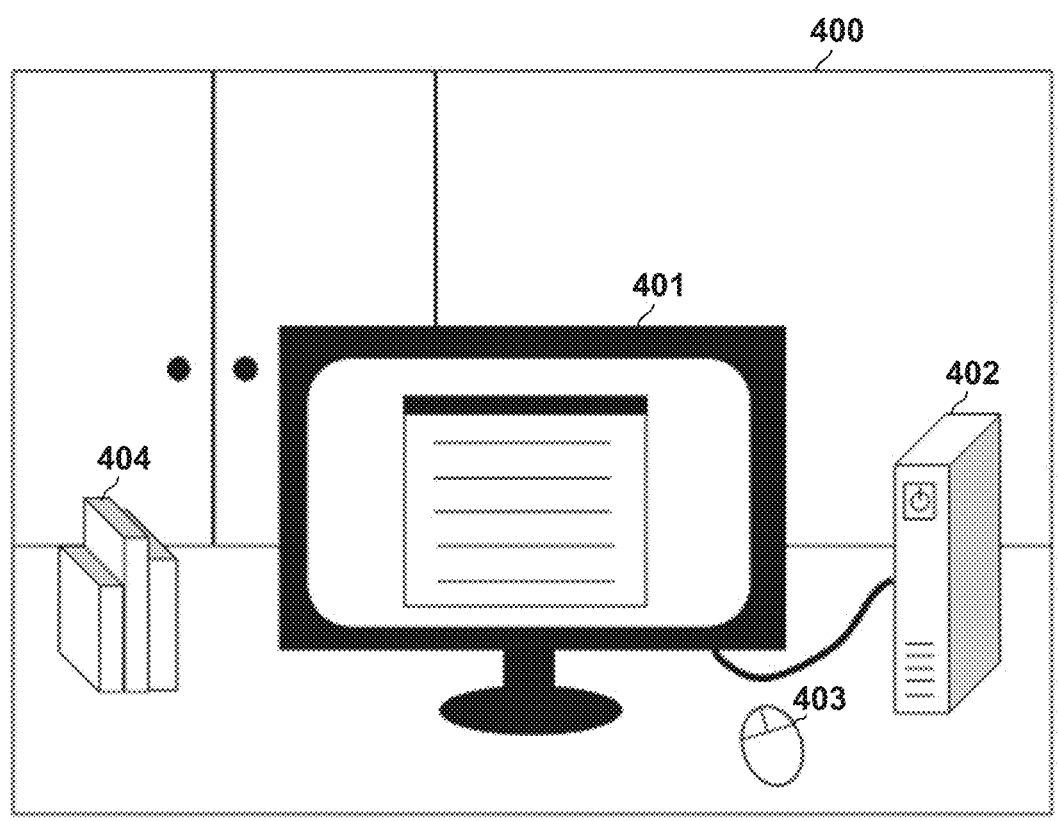
FIG. 4 is a view for explaining an example of a front image according to one or more aspects of the present disclosure.

An example of the front image will be described with reference to FIG. 4. A front image 400 is an image acquired in a state in which the user 150 who wears the glass-type device 100 sits on a chair and casts the eyes to a display 401 placed on a desk. The front image 400 includes not only the display 401 but also a personal computer main body 402, a mouse 403, and books 404. Assume that the user 150 is going to do work while viewing the display 401.

In step S302, the image recognition unit 202 determines whether an instruction for identifying an object is received from the user 150. Upon receiving the instruction (YES in step S302), the image recognition unit 202 advances the process to step S303. Otherwise (NO in step S302), step S301 is repeated. This instruction may be done via the switch 104. When step S301 is executed again, the external world image acquisition unit 201 acquires a front image as the next frame. By repeating step S301, the glass-type device 100 continuously displays a moving image of the environment in front of the user 150.

Figure 5A:
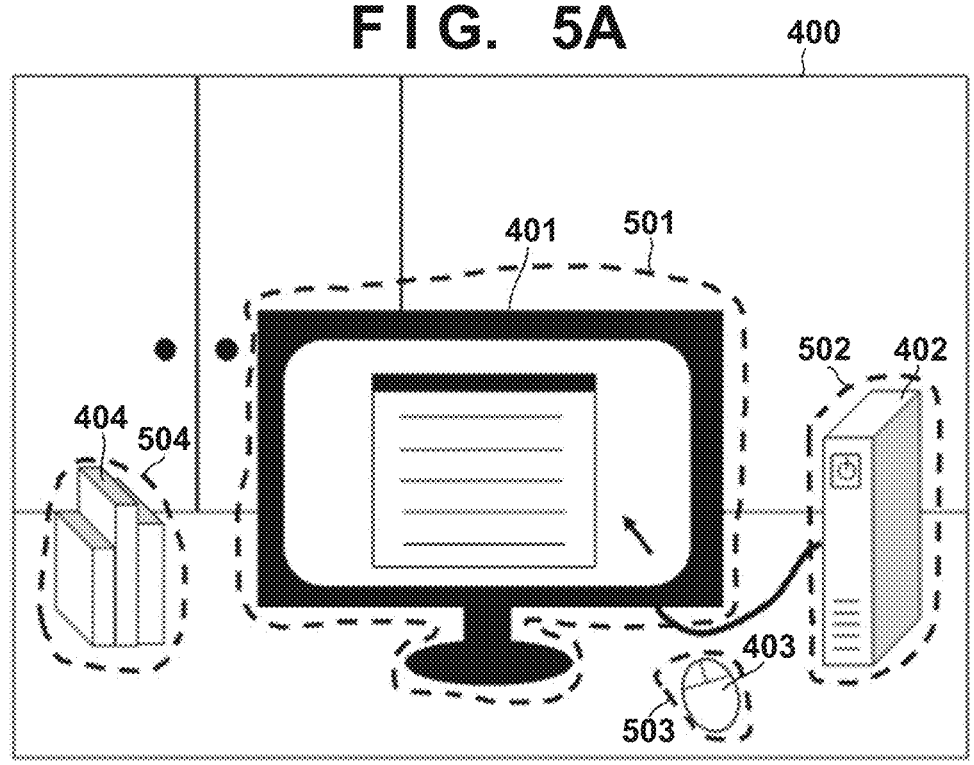
FIGS. 5A and 5B are views for explaining an example of a method of selecting an object in the front image according to one or more aspects of the present disclosure.

In step S303, the image recognition unit 202 identifies an object included in the front image. A detailed example of step S303 will be described with reference to FIGS. 5A and 5B. The image recognition unit 202 performs region division processing for the front image, thereby identifying that an object is included in each of regions 501 to 504, as shown in FIG. 5A. For example, region division processing may be performed by a method based on a hierarchical convolutional neural network as described in J. Long, E. Shelhamer, T. Darrel: Fully Convolutional Networks for Semantic Segmentation, CVPR2015.

In step S304, the image recognition unit 202 receives, from the user 150, a designation of a display target object in one or more objects included in the front image. For example, the image recognition unit 202 may set, as a designated object, an object located at the center of the front image 400 at the point of time of receiving a determination instruction from the user 150. When making such a designation, the user 150 moves the display target object to the front side of the face or in the visual line direction and then inputs a determination instruction to the glass-type device 100.

Figure 5B:
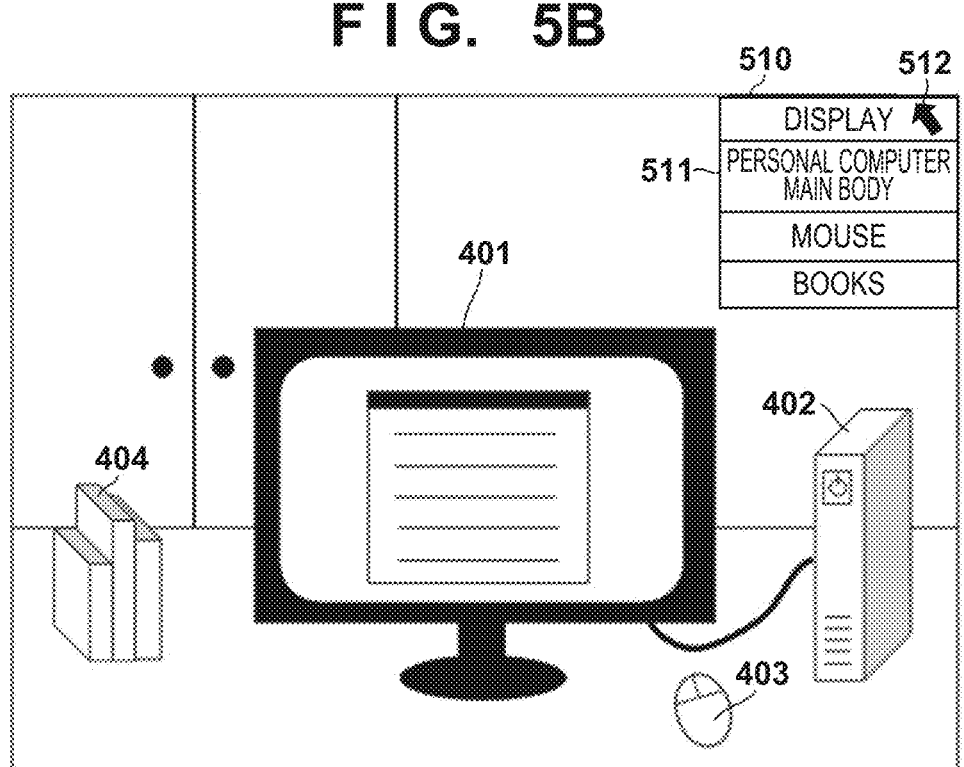

Instead, the image recognition unit 202 may identify the types of objects included in the regions 501 to 504 and generate an image used to acquire the designation of the display target object from the user 150. FIG. 5B shows an example of an image 510. The image 510 is generated by superimposing a list 511 on the front image 400. The list 511 shows the list of objects included in the front image 400. The user 150 may move a cursor 512 by operating a switch 104 and select the object as the display target. In the following description, assume that the display is designated as the display target object. The user 150 may be able to designate a plurality of objects as the display target object. The image recognition unit 202 stores the designated type of object in the storage unit 208 for subsequent processing.

In step S305, the external world image acquisition unit 201 acquires a front image and stores it in the storage unit 208. The image recognition unit 202 extracts a display target object from the front image. For example, the image recognition unit 202 specifies the region of the display target object in the front image and pixel values in this region and stores these in the storage unit 208. This specifying may be performed using a hierarchical convolutional neural network as described in, for example, Ren, Shaoqing, et al., "Faster R-CNN: Towards real-time object detection with region proposal networks", Advances in neural information processing systems, 2015. Also, when the above-described region division processing method is combined, the contour region of the detected target object can be specified more correctly.

In step S306, the biological signal acquisition unit 203 acquires a biological signal of the user 150. In the first embodiment, the biological signal acquisition unit 203 acquires a brain wave of the user 150. The biological signal acquisition unit 203 converts the brain wave into a digital format and stores it in the storage unit 208 for subsequent processing. FIG. 6 shows an example of a brain wave. The abscissa of the graph shown in FIG. 6 represents time, and the ordinate represents a signal value (the unit is µV). To perform subsequent processing based on a variation in the signal value during a period of a predetermined length, the biological signal acquisition unit 203 stores the signal value of the acquired brain wave in the storage unit 208.

In step S307, the mental state estimation unit 204 estimates the mental state of the user 150 based on the biological signal during the latest period of the predetermined length (for example, 10 sec), which is stored in the storage unit 208. Estimation of a mental state may be, for example, estimation of the degree of tension and concentration of the user 150. For example, the mental state estimation unit 204 performs FFT (Fast Fourier Transform) processing for the brain wave, thereby calculating the power of each of an alpha wave (8 to 14 Hz), a beta wave (14 to 30 Hz), and a theta wave (4 to 8 Hz) included in the brain wave. For example, in the FFT processing, a frequency analysis time window may be set to 4.096 sec, and the overlap of the time window concerning the timing of calculation may be set to 75%.

Next, the mental state estimation unit 204 compares the calculated power of each of the alpha wave, the beta wave, and the theta wave with a corresponding threshold. Each threshold is set in advance based on a brain wave of a corresponding frequency band and stored in the storage unit 208. FIG. 7 shows an example of power obtained by FFT processing and set values of thresholds. In this example, an upper limit threshold and a lower limit threshold are set for each frequency band. The mental state estimation unit 204 compares the power with the thresholds in each frequency band. If the power of the brain wave is lower than the lower limit threshold in two of the three types of frequency bands, the mental state estimation unit 204 estimates that the mental state of the user 150 is a low awaking level or low concentration level (that is, a low awaking state). If the power of the brain wave is higher than the upper limit threshold in two of the three types of frequency bands, the mental state estimation unit 204 estimates that the mental state of the user 150 is a high tension level (that is, a high tension state). If the mental state is neither the low awaking state nor the high tension state, the mental state estimation unit 204 estimates that the mental state is a concentration state appropriate to execute work.

In step S308, the image selection unit 205 decides, based on the estimated mental state, an image to be displayed to the user 150. This image is called a background image because it is displayed as a background in subsequent processing. For example, the image selection unit 205 may select, based on the mental state of the user 150, the background image from a plurality of images stored in the storage unit 208 in advance. The background image may be an image used to lead the mental state of the user 150 to a target mental state. For example, the background image may be an image used to lead the user 150 to a concentration state. In this case, if the mental state of the user 150 is estimated as a low awaking state, the image selection unit 205 selects an image used to make the user 150 tense. On the other hand, if the mental state of the user 150 is estimated as a high tension state, the image selection unit 205 selects an image used to calm the user 150 down.

Figures 8A, 8B:
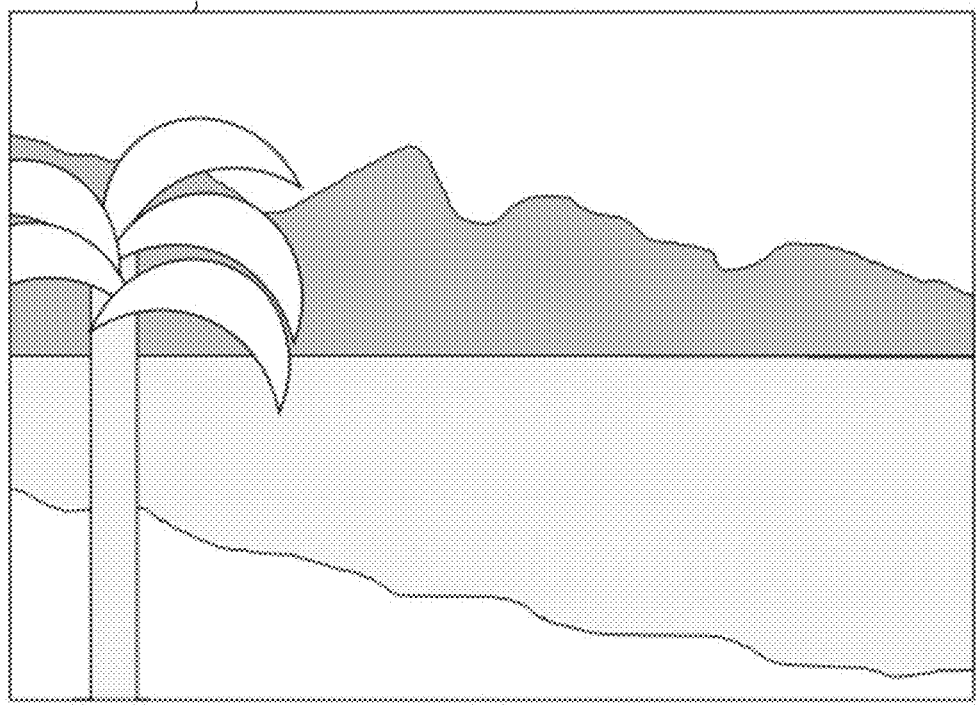
FIGS. 8A and 8B are views for explaining an example of a background image according to one or more aspects of the present disclosure.

A plurality of images stored in the storage unit 208 in advance will be described with reference to FIG. 8A. Images stored in the storage unit 208 are managed by a lookup table 801. The lookup table 801 is also stored in the storage unit 208 in advance. As shown in the lookup table 801, the storage unit 208 stores a plurality of images (L-01, . . . , H-01, . . . ) Some of the plurality of images (L-01, . . . ) are used when the mental state of the user 150 is estimated as a low awaking state. The remainings of the plurality of images (H-01, . . . ) are used when the mental state of the user 150 is estimated as a high tension state. In the lookup table 801, the images are managed by image IDs and image file names. Each image may be a still image or may be a moving image. For example, if the mental state of the user 150 is estimated as a low awaking state, the image selection unit 205 selects one of the plurality of images (L-01, . . . ) The selection may be performed at random or by round robin.

The images managed by the lookup table 801 may be images confirmed, as the result of pre-experiments for a plurality of subjects, to have the effect of leading the mental state of a subject to a concentration state when presented to the subject. As an example, an image of a scenery from a vehicle window in a drive, an image of fireworks, and the like have the effect of leading the mental state of the user 150 in a low awaking state to a concentration state. Also, images of the landscape of a grassy plain, a beach, and the like have the effect of leading the mental state of the user 150 in a high tension state to a concentration state. A background image 802 shown in FIG. 8B is a beach image that is an example of an image used to lead the mental state in a high tension state to a concentration state.

Figure 9A:
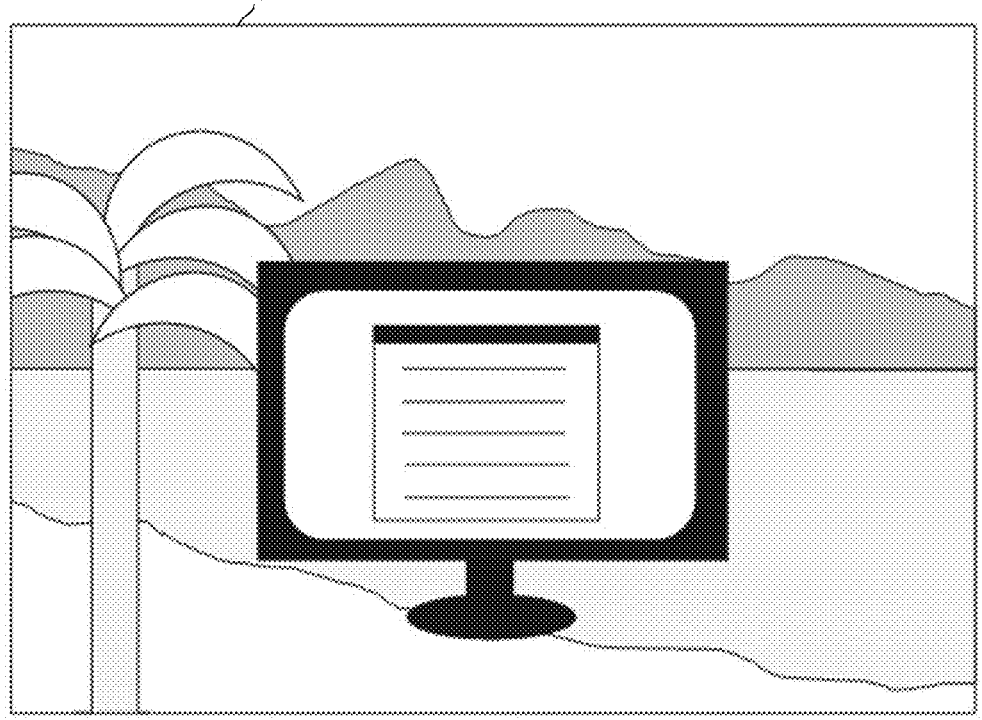
FIGS. 9A and 9B are views for explaining an example of a composite image according to one or more aspects of the present disclosure.
Figure 9B:
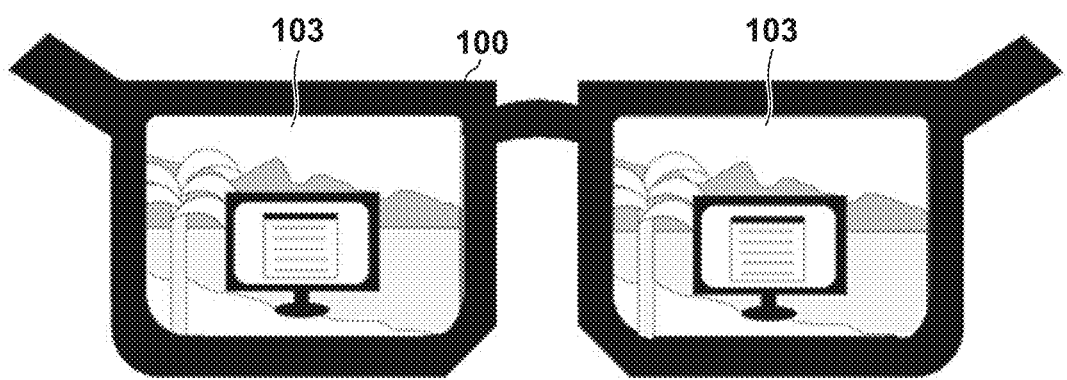

In step S309, the image composition unit 206 composites the image of the object extracted in step S305 and the background image selected in step S308, thereby generating a new image. The newly generated image is called a composite image. The image display unit 207 displays the composite image on the display device 103. For example, the image composition unit 206 may generate a composite image by superimposing the image of the display target object on the background image. The image composition unit 206 makes the position of the object in the composite image equal to the position of the object in the front image. FIG. 9A shows an example of a composite image 901 generated by superimposing the image of the display 401 included in the front image on the selected background image 802. FIG. 9B shows a state in which the composite image 901 is displayed on each display device 103 of the glass-type device 100.

In step S310, the control device 105 determines whether to end the processing. To end the processing (YES in step S310), the control device 105 ends the processing. Otherwise (NO in step S310), the control device 105 returns the process to step S305. For example, upon receiving an instruction for turning off the power supply of the glass-type device 100, the control device 105 ends the processing. Alternatively, if the user 150 detaches the glass-type device 100, the control device 105 may end the processing. The control device 105 may return the process to step S303 if an instruction for changing the display target object is received from the user 150. Unless the instruction for changing the display target object is received, the control device 105 may continuously use the object designated in step S304 during repetition of steps S305 to S309.

In the above-described method, steps S305 to S309 are repeated, thereby displaying a moving image to the user 150. That is, the composite image generated in step S309 is a frame of a moving image. In the above-described method, steps S306 to S308 are performed every time a frame is generated. Instead, steps S306 to S308 are performed for a plurality of frames.

In the above-described method, if it is estimated in step S307 that the mental state of the user 150 is a concentration state, the image selection unit 205 need not select any image. In this case, in step S309, the image composition unit 206 need not composite the images, and the image display unit 207 may directly display the front image. Instead, if it is estimated in step S307 that the mental state of the user 150 is a concentration state, the image selection unit 205 may select an image for keeping the concentration state. The image for keeping the concentration state may be an image that has a neutral effect on the mental state of the user 150, and the image is stored in the storage unit 208 in advance.

In the above-described method, the powers of an alpha wave, a beta wave, and a theta wave based on the frequency band of a brain wave are calculated. The mental state estimation unit 204 may estimate the mental state using any method. For example, the mental state estimation unit 204 may calculate, in real time, a nonlinear term parameter that models a time-series signal of a brain wave, as described in, for example, Uehara, and Saito, "Proposal of analysis method focusing on nonlinear dynamics of human EEG with chaos", Transactions of the JSME, 2018. The mental state estimation unit 204 may estimate the mental state by performing chaos analysis for estimating the degree of concentration of a user based on the nonlinearity of a brain wave. More specifically, this method uses the fact that when the user concentrates, the waveform of a brain wave that has exhibited a chaotically complex behavior transitions to a linear action.

Figure 10:
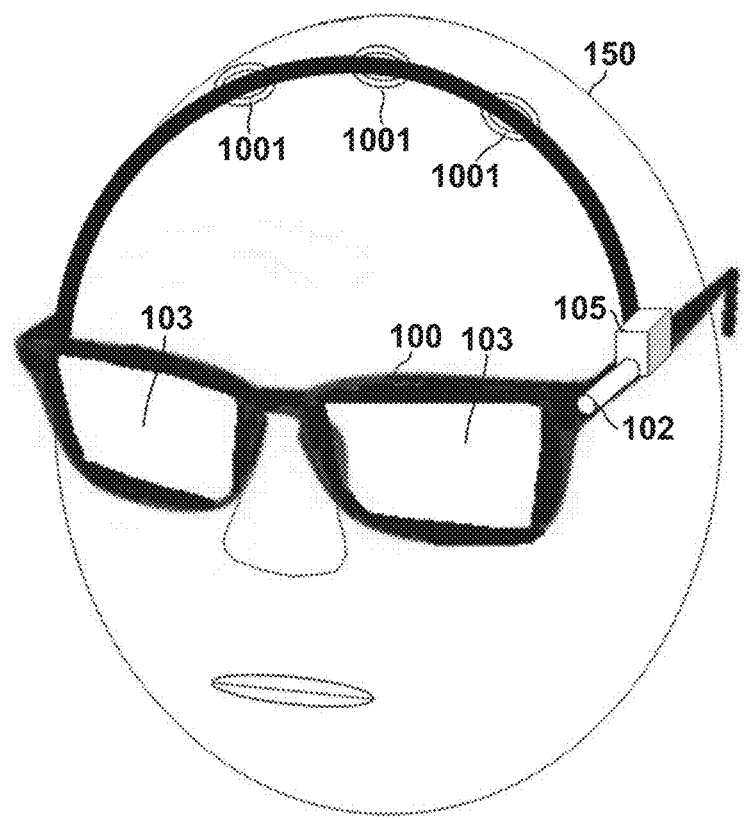
FIG. 10 is a view for explaining another example of the hardware arrangement of the glass-type device according to one or more aspects of the present disclosure.

As shown in FIG. 10, the glass-type device 100 may include biosensors 1001 in place of the biosensor 101. The biosensors 1001 are located at positions to contact the top of the head of the user 150 when the glass-type device 100 is worn by the user 150. The biosensors 1001 measure a brain wave from the top of the head of the user 150.

In the above-described method, the biological signal acquisition unit 203 may acquire another biological signal, for example, a heart rate, pulses, an electro-oculography signal, a respiration signal, a sweating signal, or the like of the user 150 in addition to a brain wave or in place of a brain wave. For example, the electro-oculography signal may be measured by a myoelectric sensor attached to the glass-type device 100 so as to contact a side of an eye of the user 150. The heart rate signal may be measured by a heart rate sensor attached to the glass-type device 100 so as to contact an ear lobe of the user. To estimate the mental state based on these biological signals, the above-described chaos analysis may be used, or another method may be used. Also, the biological signal acquisition unit 203 may acquire a biological signal by receiving a biological signal from a device other than the biosensor of the glass-type device 100, for example, a wristwatch type device or the like. In this case, the glass-type device 100 need not include the biosensor 101.

In the above-described method, the glass-type device 100 generates the composite image by superimposing a part of the front image on the background image. Instead, the glass-type device 100 may superimpose the whole front image on the background image. In this case, the front image whose size is adjusted not to hide a part of the background image is superimposed. Also, instead of superimposing the front image on the background image, the glass-type device 100 may display these side by side.

As described above, the glass-type device 100 according to the first embodiment superimposes an image of a work environment visually recognized by the user on an image used to lead the mental state of the user to a target mental state, and displays the image to the user 150. This makes it possible to lead the user to the target mental state without impeding the work of the user and maintain the state.

Second Embodiment

The second embodiment of the present disclosure will be described. Points different from the first embodiment will mainly be described below. Matters that are not described below may be similar to the first embodiment. In the first embodiment, in step S304, only an object included in the front image can be designated as the display target in the composite image. However, there is a possibility that when the user 150 is viewing a moving image formed by composite images, a person enters in the front image. The user 150 sometimes wants to display such a person. In the second embodiment, an image of a person included in the front image can also be included in the composite image.

The second embodiment is different from the first embodiment in that a person can be designated as a display target object. As the hardware arrangement and the functional arrangement of a glass-type device 100 according to the second embodiment can be the same as in the first embodiment described with reference to FIGS. 1A to 2, a repetitive description will be omitted. The operation of the glass-type device 100 according to the second embodiment is different from that of the first embodiment described with reference to FIG. 3 in the processes of steps S304, S305, and S309, and the processes of the remaining steps may be the same. The processes of steps S304, S305, and S309 will be described below in detail.

Figure 11A:
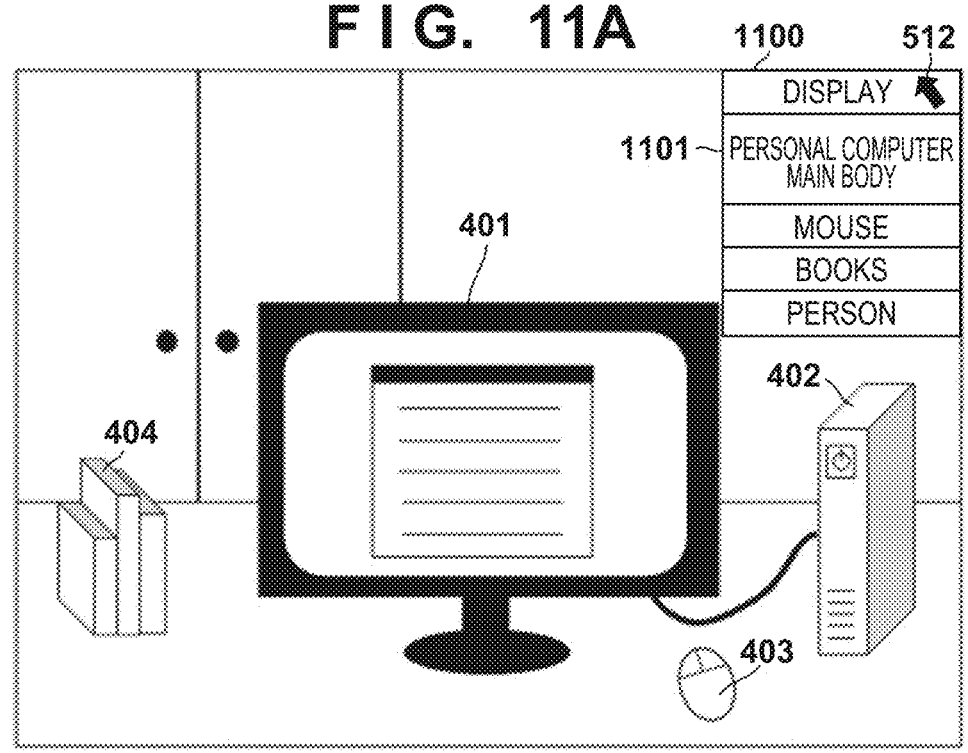
FIGS. 11A and 11B are views for explaining an example of object recognition according to one or more aspects of the present disclosure.

In step S304, an image recognition unit 202 receives a designation of a display target object from a user 150. The image recognition unit 202 can also designate a person as a display target object in addition to one or more objects included in a front image at this point of time. For example, the image recognition unit 202 may generate an image 1100 shown in FIG. 11A. The image 1100 is an image generated by superimposing a list 1101 on a front image 400 shown in FIG. 4. The list 1101 shows the list of objects included in the front image 400 and an item of a person. The user 150 may move a cursor 512 by operating a switch 104 and select the object as the display target. In the following description, assume that a display and a person are designated as the display target objects. The front image 400 used to designate an object may include a person or not.

Figure 11B:
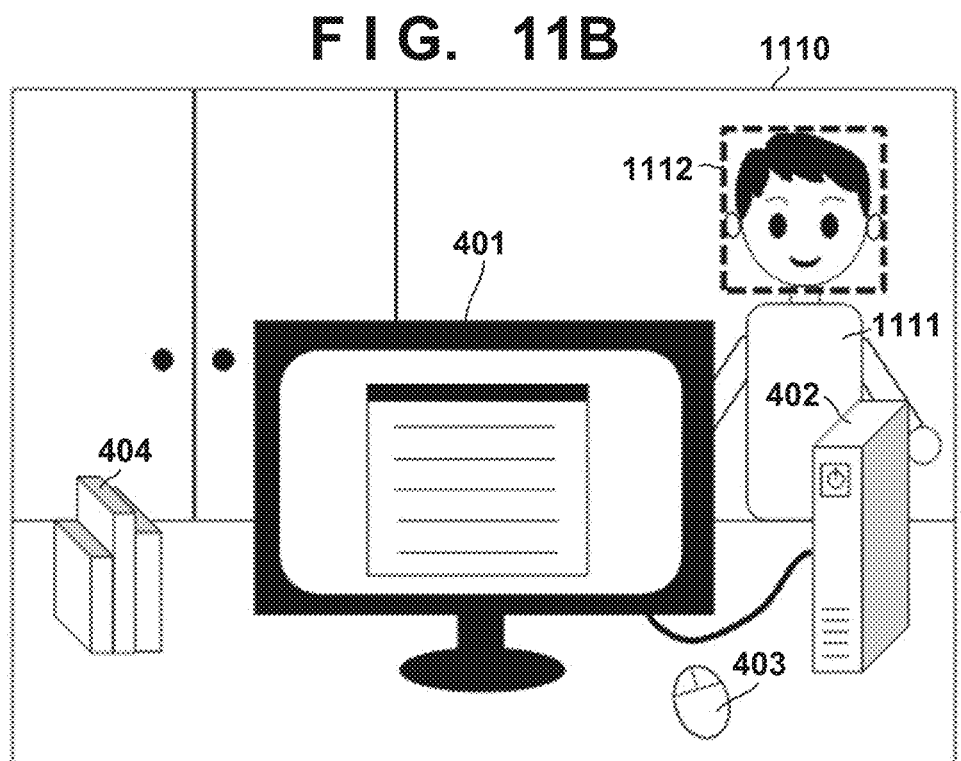
Figure 12:
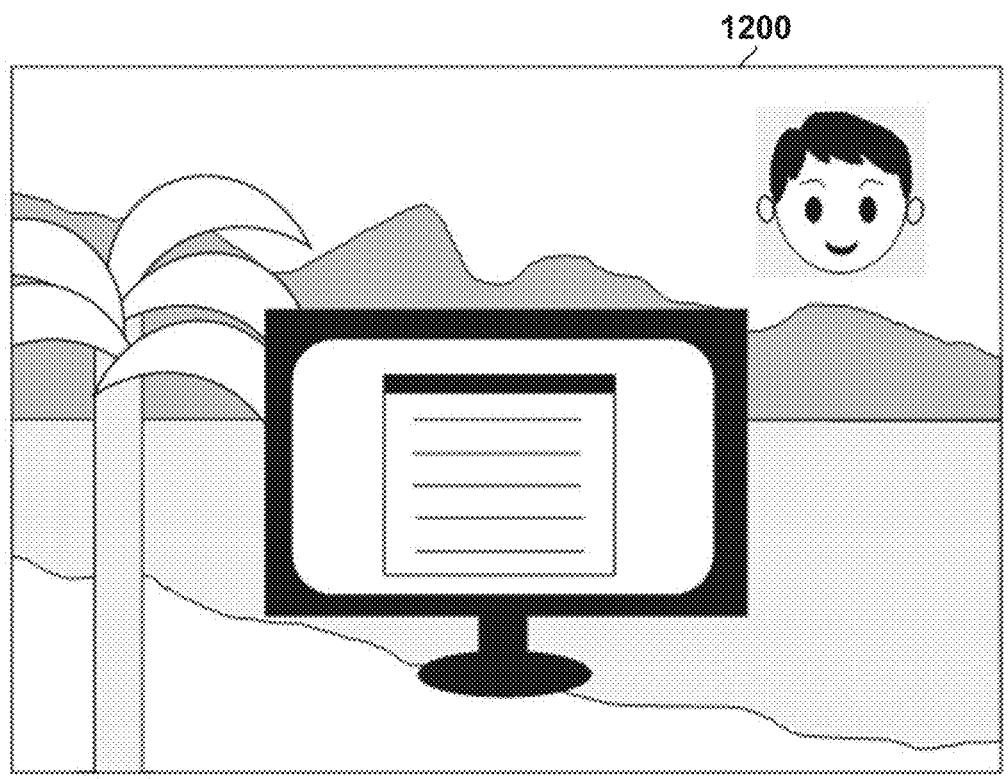
FIG. 12 is a view for explaining an example of a composite image according to one or more aspects of the present disclosure.

In step S305, an external world image acquisition unit 201 acquires the front image and stores it in a storage unit 208. If a person is designated as a display target object, the image recognition unit 202 extracts the face of a person from the front image. For example, the image recognition unit 202 specifies the position (the coordinate values of the upper left corner and the coordinate values of the lower right corner) of a rectangular region including a face and pixel values in this region by performing face detection processing for the front image, and stores these in the storage unit 208. For example, as shown in FIG. 11B, if a front image 1110 includes a person 1111, a region 1112 including the face of the person 1111 is specified. If an object other than the person is also designated as a display target object, the region of the object is also specified, as in the first embodiment.

The face detection processing may be performed using a hierarchical convolutional neural network broadly applied as a recognition processing technique. Processing in the hierarchical convolutional neural network is executed by sequentially scanning a predetermined region in an image, like general object recognition processing. In processing in the hierarchical convolutional neural network, learning is performed in advance using image data including supervised data concerning the position and size of a person face region on an image, thereby detecting the face of a person in the image. The face detection processing may be executed using a method other than the hierarchical convolutional neural network.

In step S309, an image composition unit 206 composites the image of the object extracted in step S305 with a background image selected in step S308, thereby generating a composite image. In the second embodiment, for example, an image 1200 is generated as a composite image. The image 1200 is generated by superimposing the image of a display 401 and the face image of the person 1111 included in the front image on a selected background image 802.

Figure 13A:
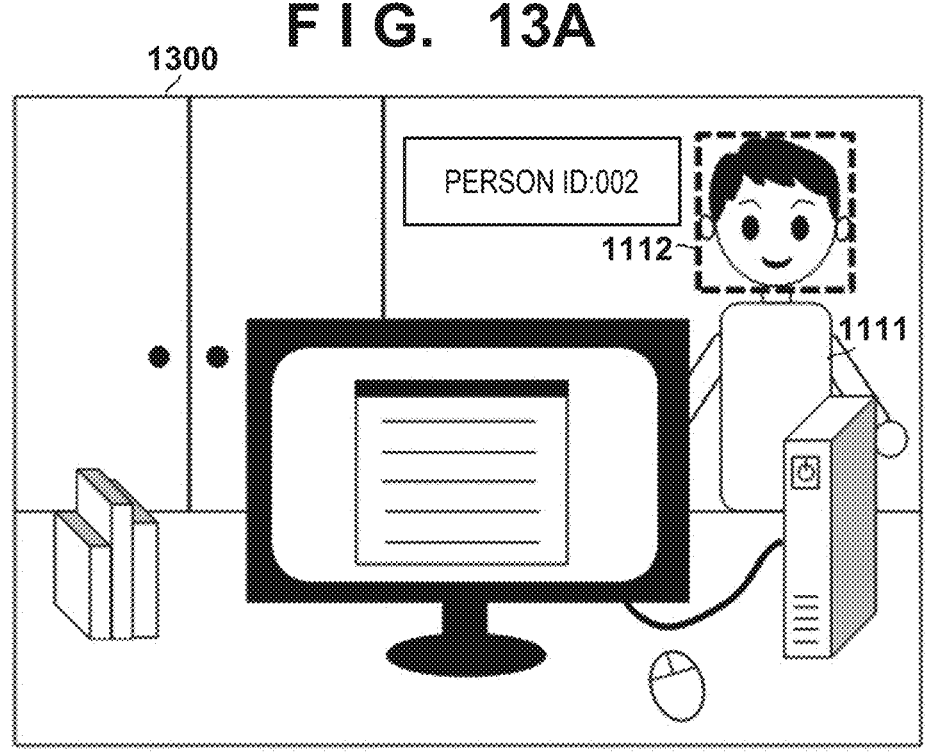
FIGS. 13A and 13B are views for explaining another example of object recognition according to one or more aspects of the present disclosure.

In the above-described method, if the user 150 designates a person as a display target object, the faces of all persons included in the front image are included in the composite image. Instead, only the face image of a person designated by the user 150 may be the display target object. For example, as shown in FIG. 13A, the image recognition unit 202 may perform face detection processing, as described above, and then perform face recognition processing for the face image included in the region 1112. For example, the image recognition unit 202 may perform the face recognition processing by comparing the face image included in a front image 1300 with a plurality of face images stored in the storage unit 208 in advance. In the example shown in FIG. 13A, the person 1111 is identified as the person with a person ID "002". The image recognition unit 202 determines whether the thus identified person matches the person of the display target set in advance by the user 150. If the persons match, the image recognition unit 202 determines that the face image of the person 1111 is the display target object. If the persons do not match, the image recognition unit 202 determines that the face image of the person 1111 is not the display target object.

The face recognition processing may be performed by a hierarchical convolutional neural network, as in the above-described face detection processing, as described in, for example, Y. Taigman, M. Yang, M. A. Ranzato and L. Wolf, "DeepFace: Closing the Gap to Human-Level Performance in Face Verification", CVPR 2014. In processing in the hierarchical convolutional neural network, learning is performed in advance using the image data of the face of each person, as in the face detection processing, thereby specifying a person from persons registered in advance concerning the image of a face region. The face recognition processing may be executed using a method other than the hierarchical convolutional neural network.

Figure 13B:
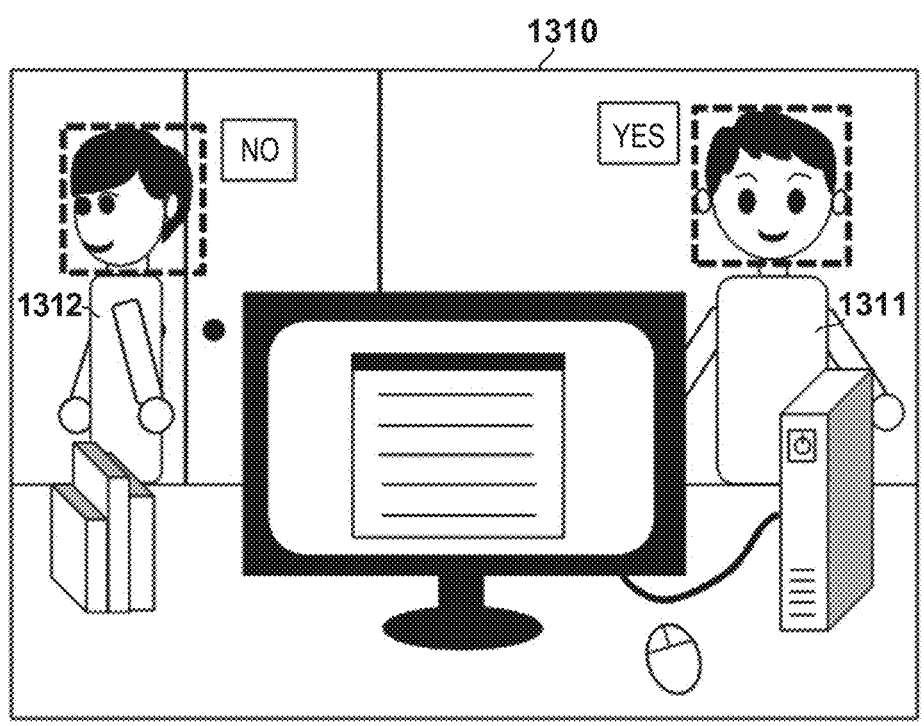

In the above-described method, if a person is determined as a display target object, a face image is included in the composite image independently of the direction of the face of the person. Instead, it may be determined, based on the direction of the face of a person, whether to include the face image in the composite image. For example, it is considered that a person who wants to speak to the user 150 faces the user 150. Hence, the image recognition unit 202 determines the direction of the detected face. If the face is directed to the user 150, it is determined that the face image is a display target object. If the face is not directed to the user 150, it is determined that the face image is not a display target object. For example, in FIG. 13B, a front image 1310 includes a person 1311 and a person 1312. Since the person 1311 faces the user 150, the image recognition unit 202 sets the face image of the person 1311 to the display target object. Since the person 1312 does not face the user 150, the image recognition unit 202 does not set the face image of the person 1312 to the display target object. Determination of the direction of the face can also be performed by the above-described hierarchical convolutional neural network. Determination of the display target object based on the direction of a face may be combined with the above-described display of a designated person. That is, only when the detected person is the person designated in advance, and the person is facing the user 150, the image recognition unit 202 may set the face image of the person to the display target object. Instead, only when the detected person is the person designated in advance, or the person is facing the user 150, the image recognition unit 202 may set the face image to the display target object. In this example, it is determined whether the person in the image is facing the user 150. The direction of the face may be determined in more detail.

As described above, the glass-type device 100 according to the second embodiment allows the user 150 to view an image of a person in addition to the effect of the first embodiment. In addition, only a person set in advance is displayed, or only a person who is considered to want to speak to the user 150 is displayed, thereby avoiding communications with unnecessary persons and more easily implementing concentration on work.

Third Embodiment

The third embodiment of the present disclosure will be described. Points different from the first embodiment will mainly be described below. Instead, the different points may be combined with the second embodiment. The glass-type device 100 according to the first embodiment operates without cooperating with another device. Instead, a glass-type device 1400 according to the third embodiment operates in cooperation with an external device 1403.

Figure 14:
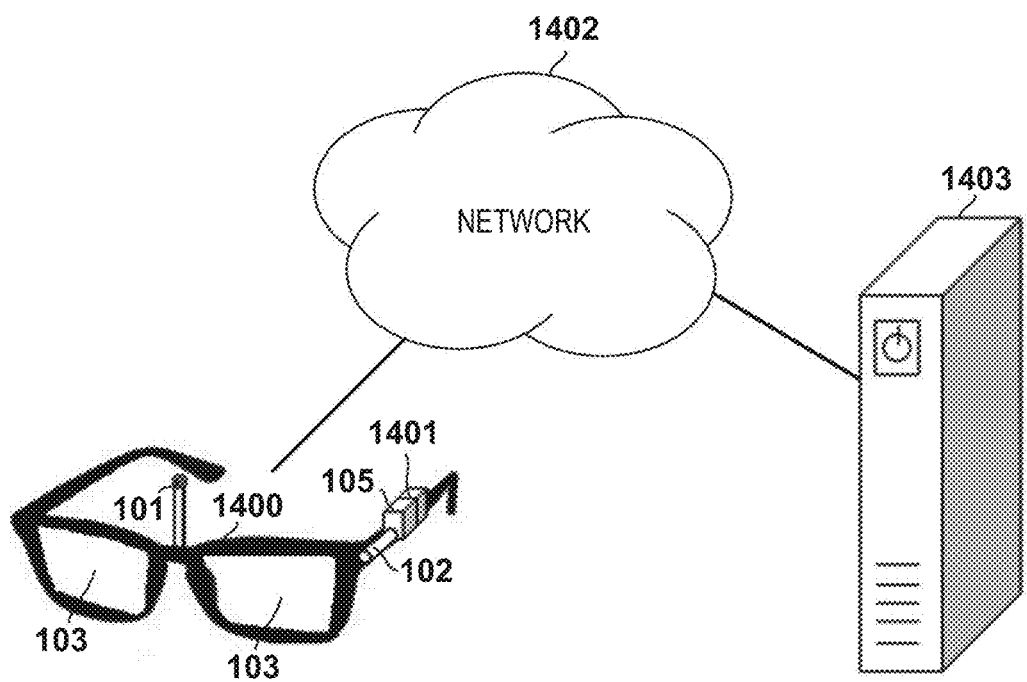
FIG. 14 is a view for explaining an example of the hardware arrangement of a glass-type device according to one or more aspects of the present disclosure.

An example of the hardware arrangement of the glass-type device 1400 according to the third embodiment will be described with reference to FIG. 14. The glass-type device 1400 includes a communication device 1401 in addition to the elements of the glass-type device 100. The communication device 1401 can be connected to a network 1402. The network 1402 may be a local network such as a LAN (Local Area Network), or may be a wide area communication network such as the Internet. The communication device 1401 may be connected to the network 1402 by wireless connection or wired connection. When performing wireless connection, the communication device 1401 may be connected to the network 1402 by Wi-Fi® communication, or may be connected to the network 1402 by cellular communication.

The device 1403 is also connected to the network 1402. If the network 1402 is a local network, the device 1403 is, for example, a computer held by a user 150. If the network 1402 is a wide area communication network, the device 1403 is, for example, a server that provides a service to the user 150. The communication device 1401 can communicate with the device 1403 via the network 1402. Instead, the communication device 1401 may communicate with the device 1403 by peer-to-peer.

In the first embodiment, a plurality of images (that is, background image candidates) managed by the lookup table 801 are stored in the storage unit 208 of the control device 105. In the third embodiment, a plurality of images managed by a lookup table 801 are stored in the storage unit of the device 1403. An image selection unit 205 of a control device 105 acquires an image selected from the lookup table 801 by downloading it from the device 1403 via the network 1402. This obviates the necessity of storing images in a storage unit 208 of the control device 105, and the capacity necessary for the storage unit 208 can be reduced.

Figure 2:
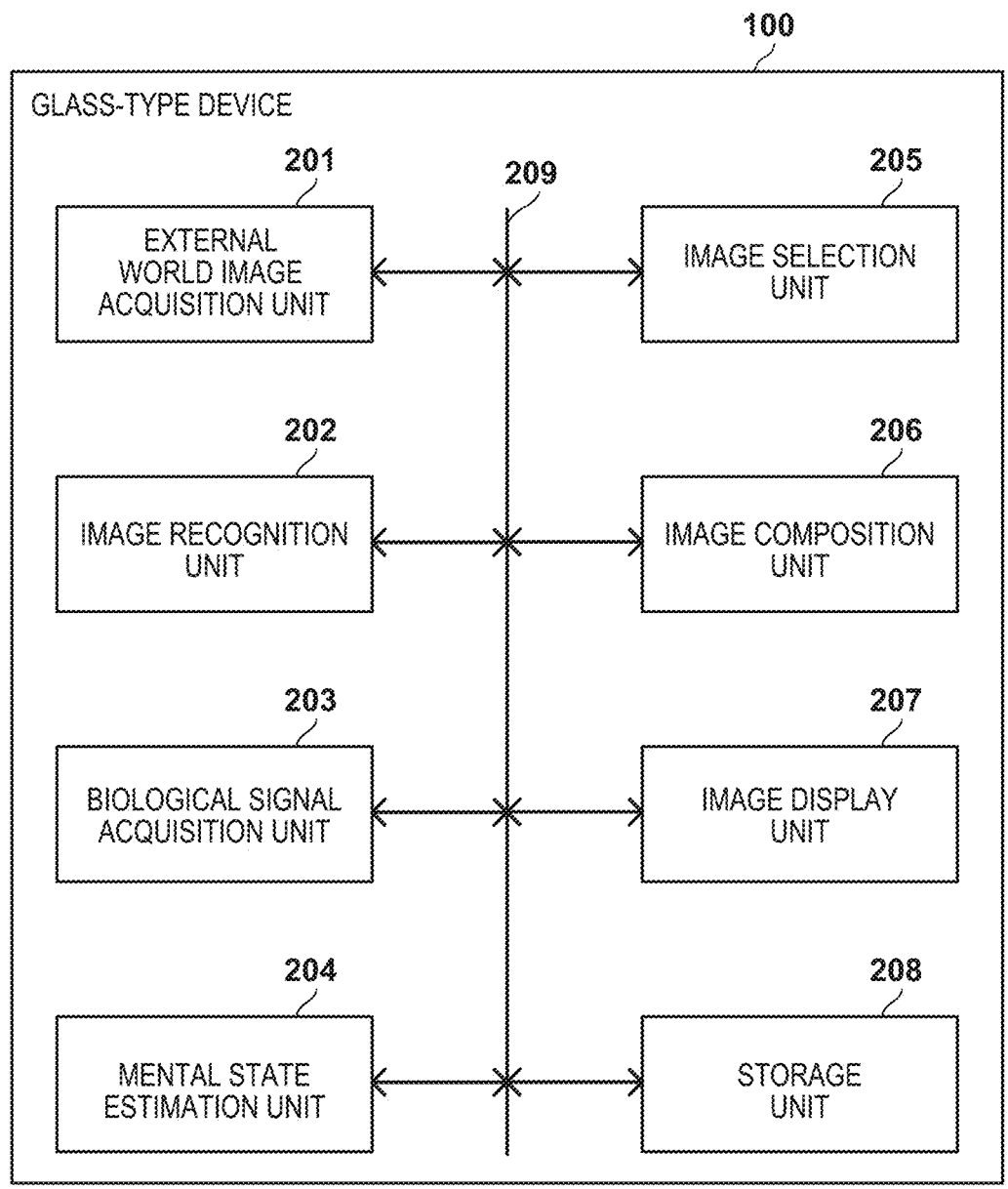
FIG. 2 is a block diagram for explaining an example of the functional arrangement of the glass-type device according to one or more aspects of the present disclosure.

In the first embodiment, all the functions shown in FIG. 2 are held by the glass-type device 100. In other words, in the first embodiment, the control device 105 that performs the operation shown in FIG. 3 is mounted in the glass-type device 100. Instead, in the third embodiment, some or all of an external world image acquisition unit 201, an image recognition unit 202, a biological signal acquisition unit 203, a mental state estimation unit 204, the image selection unit 205, an image composition unit 206, and the storage unit 208 may be provided by the device 1403. For example, if the device 1403 includes the external world image acquisition unit 201, the external world image acquisition unit 201 of the device 1403 acquires, via the network 1402, a front image captured by an image capturing device 102. If the device 1403 includes the biological signal acquisition unit 203, the biological signal acquisition unit 203 of the device 1403 acquires, via the network 1402, a biological signal measured by a biosensor 101. If the device 1403 includes the image composition unit 206, the image composition unit 206 of the device 1403 provides a generated composite image to an image display unit 207 of the glass-type device 1400 via the network 1402. The communication device 1401 and the device 1403 may compress and then transmit data. As described above, when the device 1403 executes part of processing of the glass-type device 1400, it is possible to reduce the processing load on the glass-type device 1400, and it is possible to make the glass-type device 1400 compact and save power. The device 1403 that executes part of the processing of the glass-type device 1400 may be called the control device of the glass-type device 1400. In this case, the device 1403 functioning as the control device of the glass-type device 1400 is not mounted in the glass-type device 1400 and communicates with the glass-type device 1400 via the network 1402.

Fourth Embodiment

The fourth embodiment of the present disclosure will be described. Points different from the first embodiment will mainly be described below. Instead, the different points may be combined with the second embodiment or the third embodiment. In the first embodiment, if there are a plurality of images for leading the user 150 to a target mental state, one of them is selected at random or by round robin. In the fourth embodiment, one image is selected from a plurality of images based on the degree of change of the mental state in the past use of the image.

Figure 15:
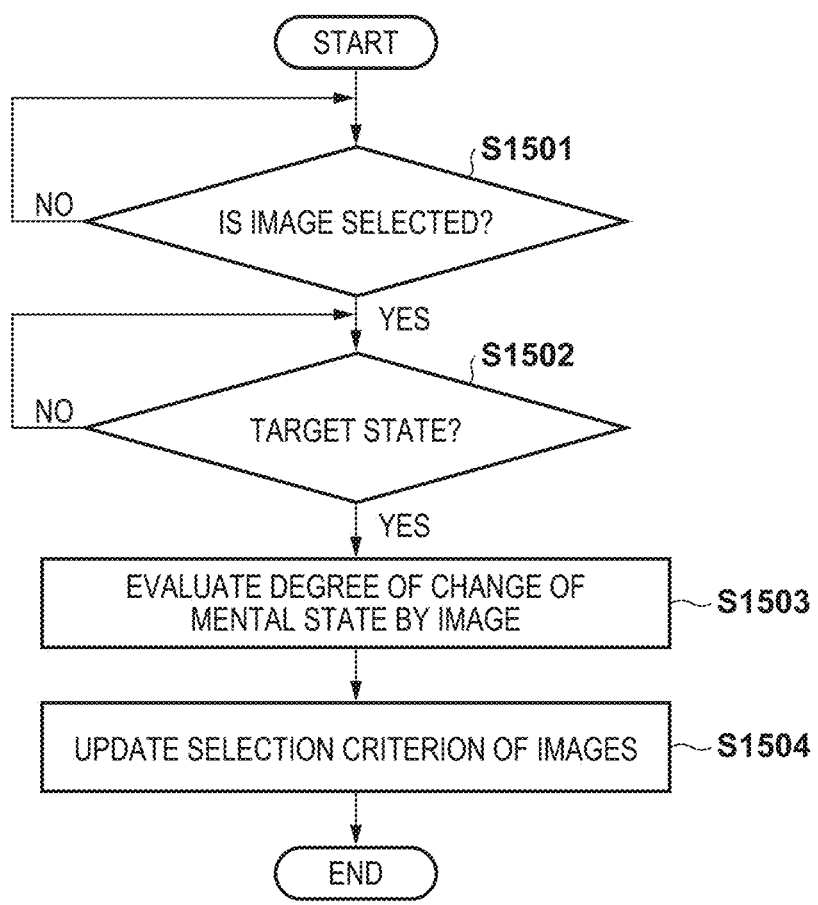
FIG. 15 is a flowchart for explaining an example of the operation of the glass-type device according to one or more aspects of the present disclosure.

An example of the operation of an image selection unit 205 will be described with reference to FIG. 15. This operation is executed in parallel to the operation shown in FIG. 3. In step S1501, the image selection unit 205 determines whether a background image is selected in step S308 of FIG. 3. If a background image is selected (YES in step S1501), the image selection unit 205 advances the process to step S1502. Otherwise (NO in step S1501), step S1501 is repeated.

In step S1502, the image selection unit 205 determines whether the mental state of a user 150 is the target mental state. If the mental state is the target mental state (YES in step S1502), the image selection unit 205 advances the process to step S1503. Otherwise (NO in step S1502), step S1502 is repeated.

In step S1503, the image selection unit 205 evaluates the degree of change of the mental state of the user 150 by the selected background image. The degree of change may be evaluated based on the time needed until the mental state of the user 150 changes to the target mental state. The shorter the needed time is for an image, the higher the obtained evaluation is. In place of the needed time, the image selection unit 205 may obtain, as evaluation values, the powers of an alpha wave, a beta wave, and a theta wave based on the frequency band of a brain wave and the change amounts of the powers, or may obtain a nonlinear parameter value in chaos analysis as an evaluation value. The image selection unit 205 may learn the relationship between an image presented to the user in the past and an evaluation value by nonlinear regression processing by using, for example, an image ID as input information for a neural network and an evaluation value as a continuous value output of the neural network.

In step S1504, the image selection unit 205 updates the selection criterion of the plurality of images managed by the lookup table 801 based on the evaluation of the selected image. For example, the image selection unit 205 raises the selection order of an image of a high evaluation. If the same image is always presented to the user 150, the effect of leading the mental state to a target mental state may decrease because the user is "tired of or accustomed to" the image. Hence, the selection order of an image may be raised by increasing the probability of selecting the image.

The image selection unit 205 may be included in a control device 105, as in the first embodiment, or may be included in an external device 1403, as in the third embodiment. If the device 1403 is a high-performance server, the device 1403 can execute large-scale processing. Hence, the device 1403 can also composite an image more appropriate to lead the user 150 to a target mental state based on an image presented to the user in the past and the evaluation value of the image. For example, as shown in Ian J. Goodfellow, Jean Pouget-Abadiey, Mehdi Mirza, Bing Xu, David Warde-Farley, Sherjil Ozairz, Aaron Courville, Yoshua Bengio, "Generative Adversarial Nets", NIPS2014, a generative adversarial network widely known as an embodiment of a neural network may be used.

As described above, a glass-type device 100 according to the fourth embodiment can more appropriately select a background image in addition to the effect of the first embodiment. This can easily lead the user 150 to a target mental state.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure is not limited to the above embodiments and various changes and modifications can be made within the spirit and scope of the present disclosure. Therefore, to apprise the public of the scope of the present disclosure, the following claims are made.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-066954, filed Apr. 2, 2020 which is hereby incorporated by reference herein in its entirety.

What is claimed is:

1. A control device of a head-mounted device including an image capturing device configured to capture an environment around a wearer and a display device configured to display an image to the wearer, the control device comprising at least one processor and a memory comprising instructions, that when executed by the at least one processor, cause the at least one processor to:
acquire a first image captured by the image capturing device, wherein the first image includes an object image;
acquire a second image used to lead a mental state of the wearer to a target mental state; and
composite the first image and the second image, thereby generating a third image to be displayed on the display device, wherein the third image includes the object image included in the first image and the second image constitutes a region surrounding the object image,
wherein the second image used to lead the mental state of the wearer to the target mental state is determined independently of the first image captured by the image capturing device, and
wherein the instructions further cause the at least one processor to
add at least a face image of a person included in the first image to the third image in a case that the person is a person designated by the wearer, and
cease to add at least a face image of a person included in the first image to the third image in a case that the person is not a person designated by the wearer.

2. The device according to claim 1, wherein the head-mounted device further comprises a biosensor configured to measure a biological signal of the wearer, and
the instructions further cause the at least one processor to estimate the mental state of the wearer based on the biological signal measured by the biosensor.

3. The device according to claim 1, wherein the instructions further cause the at least one processor to select the second image from a plurality of images based on the mental state of the wearer.

4. The device according to claim 3, wherein the instructions further cause the at least one processor to select the second image from the plurality of images also based on a degree of change of the mental state of the wearer when each image of the plurality of images was used in the past.

5. The device according to claim 1, wherein the instructions further cause the at least one processor to generate the third image by superimposing a part of the first image on the second image.

6. The device according to claim 1, wherein the instructions further cause the at least one processor to make the third image include, of at least one object included in the first image, an image of an object designated by the wearer.

7. The device according to claim 1, wherein the instructions further cause the at least one processor to generate a fourth image to be displayed on the display device to acquire, from the wearer, a designation of an object to be included in the third image.

8. The device according to claim 1, wherein the instructions further cause the at least one processor to make the third image include a face image of a person included in the first image.

9. The device according to claim 1, wherein the control device is mounted in the head-mounted device.

10. The device according to claim 1, wherein the control device is not mounted in the head-mounted device, and communicates with the head-mounted device via a network.

11. A head-mounted device comprising:
an image capturing device configured to capture an environment around a wearer;
a display device configured to display an image to the wearer; and
a control device according to claim 1.

12. The device according to claim 1, the instructions further cause the at least one processor to make the position of the object image in the third image equal to the position of the object image in the first image.

13. A control device of a head-mounted device including an image capturing device configured to capture an environment around a wearer and a display device configured to display an image to the wearer, the control device comprising at least one processor and a memory comprising instructions, that when executed by the at least one processor, cause the at least one processor to:
acquire a first image captured by the image capturing device, wherein the first image includes an object image;
acquire a second image used to lead a mental state of the wearer to a target mental state; and
composite the first image and the second image, thereby generating a third image to be displayed on the display device, wherein the third image includes the object image included in the first image and the second image constitutes a region surrounding the object image,
wherein the second image used to lead the mental state of the wearer to the target mental state is determined independently of the first image captured by the image capturing device,
wherein the instructions further cause the at least one processor to add at least a face image of a person included in the first image to the third image in a case that the person faces to a specific direction, and
cease to add at least a face image of a person included in the first image to the third image in a case that the person does not face to the specific direction.

14. A head-mounted device comprising:
an image capturing device configured to capture an environment around a wearer;
a display device configured to display an image to the wearer; and
a control device according to claim 13.

15. A control device of a head-mounted device including an image capturing device configured to capture an environment around a wearer, a display device configured to display an image to the wearer, a bio sensor configured to measure a biological signal of the wearer, and a processor configured to estimate a mental state of the wearer based on the biological signal measured by the biosensor, the control device comprising at least one processor and a memory comprising instructions, that when executed by the at least one processor, cause the at least one processor to:
acquire a first image captured by the image capturing device, wherein the first image includes an object image;
acquire a second image selected based on the biological signal and independently of the first image captured by the image capturing device; and
composite the first image and the second image, thereby generating a third image to be displayed on the display device, wherein the third image includes the object image included in the first image and the second image constitutes a region surrounding the object image,
wherein the instructions further cause the at least one processor to add at least a face image of a person included in the first image to the third image in a case that the person faces to a specific direction, and
cease to add at least a face image of a person included in the first image to the third image in a case that the person does not face to the specific direction.

16. The device according to claim 15, wherein the control device is mounted in the head-mounted device.

17. The device according to claim 15, wherein the control device is not mounted in the head-mounted device, and communicates with the head-mounted device via a network.

18. A head-mounted device comprising:
- an image capturing device configured to capture an environment around a wearer;
- a display device configured to display an image to the wearer; and
- a control device according to claim 15.

19. The device according to claim 15, the instructions further cause the at least one processor to make the position of the object image in the third image equal to the position of the object image in the first image.

* * * * *